United States Patent Office 3,578,395
Patented May 11, 1971

---

3,578,395
RECOVERY OF METALS
Harris E. Kluksdahl, San Rafael, and James R. Hopkins, Sonoma, Calif., assignors to Chevron Research Company, San Francisco, Calif.
No Drawing. Filed Dec. 26, 1967, Ser. No. 693,193
Int. Cl. C01g 49/00
U.S. Cl. 23—20                                    8 Claims

ABSTRACT OF THE DISCLOSURE

A catalyst containing rhenium in the oxidized state supported on a porous solid carrier is treated with an excess of an ionic solution at a pH from 0–12 to recover rhenium from the catalyst without dissolving the carrier.

BACKGROUND

Field

The present invention relates to the recovery of metal values from catalysts. More specifically, the present invention is concerned with the treatment of rhenium-containing catalysts to effectively recover therefrom substantial amounts of the rhenium values. Furthermore the present invention relates to selectively recovering rhenium from a catalyst comprising platinum and rhenium supported on a porous solid carrier.

Prior art

Catalysts comprising noble metals, particularly platinum supported on porous solid carriers, for example, alumina, are effectively used for the hydroconversion of hydrocarbon feedstocks. More recently, a catalyst comprising platinum and rhenium supported on a porous solid carrier, for example, alumina, has been found to be highly active and selective for the reforming of naphtha fractions. The use of an expensive promoter, i.e., rhenium, is further justified because of the catalyst's excellent yield and temperature stability.

A catalyst gradually becomes deactivated after being in contact with a hydrocarbon feed at elevated temperatures and pressures for an extended period of time. Deposition of carbonaceous material on catalytically active sites is a contributing factor to the deactivation of the catalyst. Thus, the catalyst must be periodically regenerated or reactivated by known processes, for example, heating the catalyst at elevated temperatures in the presence of an oxygen-containing gas. Generally, regeneration of the catalyst restores its activity to nearly the same level as fresh catalyst. However, after the catalyst has seen many regenerations, it becomes more and more difficult to restore the activity of the catalyst to its former condition. It then becomes necessary to replace the deactivated catalyst with fresh catalyst. The deactivated or spent catalyst must be processed to recover the precious metals.

The prior art is replete with methods for recovering noble metals, as, for example, platinum from deactivated platinum-containing catalysts. For example, platinum can be removed from the support by dissolving platinum in aqua rega. However, this method has the disadvantage in that aqua rega generally dissolves significant amounts of the support. Platinum can also be recovered from a platinum-containing catalyst by dissolving the support and recovering a platinum residue. Porous solid supports, for example, alumina, can be dissolved without the platinum dissolving by contacting the catalyst with strong acids, such as concentrated sulfuric, concentrated nitric or concentrated HCl, or with strong alkali solutions, for example, concentrated sodium hydroxide or potassium hydroxide.

The recovery of the precious metals, platinum and rhenium, from catalysts comprising the same can be achieved by methods similar to those used for recovering platinum. Thus, for example, platinum and rhenium can be recovered from a catalyst comprising platinum and rhenium supported on a porous solid support, e.g. alumina, by digesting the catalyst in a solution of concentrated acid or concentrated base. Preferably, a concentrated base, for example, sodium hydroxide, is used. The acid or base dissolves the alumina, leaving a solid residue comprising essentially the metals, platinum, and rhenium. The residue may also contain small amounts of undissolved support. The residue is separated from the concentrated acid or base solution and then dissolved in aqua regia. The acid solution containing dissolved platinum and rhenium is then diluted and the platinum and rhenium separated from each other by known techniques, for example, ion exchange. On the other hand, platinum and rhenium can be maintained in the same solution and used for impregnating a fresh porous solid support in the preparation of fresh catalyst. However, often it is desirable to recover platinum and rhenium separately.

SUMMARY OF THE INVENTION

The present invention comprises a process for selectively removing rhenium from a catalytic composite comprising rhenium and a porous solid support without dissolving the support. The present process for recovering rhenium from a catalytic composite comprising rhenium associated with a porous solid carrier comprises treating the composite containing rhenium in the oxidized state with an excess of an ionic solution at a pH of from 0 to 12 for a sufficient time to dissolve the rhenium without substantially dissolving the carrier.

As a preferred embodiment of the present invention, a catalyst comprising a Group VIII noble metal, e.g., platinum, and rhenium associated with an inorganic oxide carrier is heated in an oxygen-containing atmosphere at an elevated temperature to oxidize the rhenium. Thereafter the composite comprising oxidized rhenium is treated with an excess of an ionic solution of at least 0.05 molar with respect to the anion at a pH of from 0 to 12 for a period of time from about 5 minutes to 2 hours, the shorter times being used with the solutions of lower pH, whereby oxidized rhenium is selectively dissolved from the composite without substantially dissolving the platinum and inorganic oxide carrier. Preferably, the inorganic oxide is alumina and the ionic solution is a salt solution.

DESCRIPTION OF THE INVENTION

Catalyst composites from which rhenium can be recovered by means of the present invention comprise rhenium associated with porous solid carriers. The porous carrier can include a large number of materials upon which catalytically active amounts of rhenium can be deposited. The carrier can be, for example, silicon carbide, charcoal or carbon. Preferably, the porous solid carrier is an inorganic oxide. The inorganic oxide can be of high surface area, for example, have a surface area of 50 to 700 m.²/gm., or preferably, 100 to 700 m.²/gm. The carrier can be a natural or synthetically produced inorganic oxide or combination of inorganic oxides. Thus, the inorganic oxide support can include the naturally occurring aluminum silicates, synthetically produced crystalline zeolitic aluminosilicates, synthetically produced silica-alumina, silica zirconia, silica-alumina-zirconia, silica-magnesia, and silica-alumina-magnesia. The support can also be magnesia or alumina.

The present invention can be used to recover rhenium from a catalyst comprising a porous solid support, rhenium and a Group VIII noble metal, for example, platinum, palladium, rhodium, osmium, iridium and ruthenium. The invention is particularly suitable for selectively recovering rhenium from a catalyst comprising platinum and rhenium associated with a porous solid support, for example, alumina. Generally, Group VIII noble metal-rhenium catalysts will have the noble metal present in a concentration from about 0.01 to 3 weight percent, and more preferably from about 0.1 to 1.5 weight percent. The rhenium content will generally be from about 0.01 to 5 weight percent and preferably 0.01 to 2 weight percent. The metals are generally associated with the support by impregnation, ion-exchange, etc.

The present invention is particularly applicable to catalysts which have become deactivated through prolonged contact with hydrocarbons at elevated temperatures and pressures. The deactivated catalyst can be calcined in air at an elevated temperature to remove carbonaceous deposits which have accumulated on the catalyst and which carbonaceous deposits sometimes present difficulties when recovering the precious metals. The calcination treatment for the deactivated catalyst can be performed under conditions to oxidize the rhenium. It is understood of course that the present invention is also applicable to catalysts which are not necessarily deactivated. Thus, rhenium can be recovered from fresh catalysts by the present process.

It is essential for the process of the present invention, however, that the rhenium exist in the oxidized state prior to contact with the ionic solution; preferably the rhenium exists in the heptavalent oxidation state. The rhenium can be converted to the oxidized state by heating the catalytic composite in an oxidizing atmosphere, e.g., an oxygen-containing atmosphere at a temperature from about 300° F. to 1400° F. Preferably, the calcination temperature will be from 300° F. to 1200° F. The catalytic composite comprising rhenium is contacted with the oxidizing atmosphere at elevated temperatures for sufficient time to oxidize said rhenium. Shorter contact times can be used with the higher temperatures. Generally, 15 minutes to 24 hours is sufficient time to oxidize the rhenium. Preferably, less than 5 hours is required. Pure oxygen may be used as the oxidizing atmosphere but preferably oxygen diluted with nitrogen or other nonreactive substance is desired. Air is preferred as the oxidizing medium for the calcination process.

The catalyst comprising rhenium in the oxidized state, preferably the heptavalent state, is contacted with an excess of an ionic solution. More solution is used than that required to fill the pores of the porous solid support. Thus, at least a twofold excess of solution is preferred and preferably at least a tenfold excess of solution, that is, at least 10 pore volumes of solution.

The ionic solution should preferably have at least 0.05 mole per liter of solution of anion dissolved in said solution. More preferably, an ionic solution of at least 0.1 molar with respect to the anion is desired. The more concentrated the solution is with respect to the anion, the easier the oxidized rhenium is removed. Preferably, the total ionic concentration, i.e., the total amount of anion present in the solution, should exceed the total amount of rhenium present on the catalyst. When the total moles of anion exceed the total moles of rhenium, greater removal or dissolution of rhenium is obtained. The process of the present invention preferably results in removal of at least 50 percent of the rhenium present on the catalyst and more preferably 60 percent. Substantially none of the carrier is dissolved in this process. When a noble metal, e.g. platinum, is present on the catalyst, substantially none of the noble metal is removed by the present process; i.e., less than 10 percent and generally less than 5 percent noble metal is removed.

The ionic solution can be prepared by dissolving or mixing any or various ionic compounds with water. Solvents other than water can be used, but the solvent should be such that the ionic compounds can freely dissociate therein. Suitable compounds for purposes of the present invention include among others the acids, e.g., hydrochloric acid, hydrobromic acid, sulfuric acid, nitric acid, chromic acid, and phosphoric acid; the bases, e.g. sodium hydroxide, potassium hydroxide, ammonium hydroxide; and the salts, e.g., sodium chloride, sodium bromide, sodium carbonate, calcium carbonate, potassium carbonate, sodium sulfate, sodium bisulfite, etc. Mixtures of two or more ionic compounds can also be used. The type of cation is not particularly important except that cations should be excluded which have deleterious effects on the carrier or rhenium or other metals present. Preferred for purposes of the present invention are the acids and the salts. Bases do not result in the removal of rhenium as readily as the acids and salts. It is still more preferred to use salt solutions, e.g., sodium chloride, sodium carbonate, etc.; there is less tendency for salt solutions to dissolve the carrier.

The acidity or basicity of the solution must be controlled in order to prevent the dissolution of substantial amounts of the carrier or of other metals which may be present in addition to the rhenium, e.g., noble metals, as palladium, platinum, rhodium, ruthenium, etc. The pH of the solution should be in the range of 0 to 12. A pH less than 0 or greater than 12 will cause significant amounts of carrier and other noble metals, e.g. platinum, to be dissolved along with the rhenium. Preferably the pH should be within the range from 2 to 12 and more preferably from 4 to 10. The more preferred pH ranges are particularly suitable when using salt solutions.

The temperature of the rhenium-extracting ionic solution can be maintained at room temperature or can be heated to a higher temperature. Thus, for example, the temperature of the ionic solution can be maintained at from room temperature to 200° F., but preferably will be from room temperature to about 100° F.

The carrier containing rhenium is contacted with an excess of the ionic solution at a pH from 0 to 12 for sufficient time to remove substantial amounts of the rhenium. Generally, a contact time of from about 5 minutes to 2 hours is sufficient to remove substantial amounts of rhenium without dissolving substantial amounts of the carrier or other metal, e.g., platinum, if present. The shorter contact times are used with the more acidic solutions or lower pH. Thus, when the solution has a pH below about 2, the contact time should preferably be less than 15 minutes. At the higher pH, i.e. above 2, and particularly when using neutral solutions, the contact time can be as high as 2 hours. Preferably, the contact time is from 5 to 30 minutes.

The catalyst composite containing oxidized rhenium can be successively contacted with excess ionic solution in accordance with the present invention with or without pretreatment steps between each contact with the ionic solution. Thus, a catalyst which has had substantial amounts of oxidized rhenium extracted by process of the present invention can be dried and calcined and then contacted again with an excess of ionic solutions in accordance with the present invention. Alternately, the catalyst can be contacted with multiple solutions without a calcination step between each contact.

The solution containing the dissolved rhenium will generally be further processed to remove rhenium therefrom. Processes for recovering rhenium from solution are known in the art. For example, a convenient method for recovering rhenium in a pure state involves passing the solution containing dissolved rhenium through an ion exchange resin to remove any dissolved metal impurities present, e.g. platinum. The effluent from the ion exchange resin containing dissolved rhenium is then acidified and contacted with $H_2S$, as for example, by bubbling $H_2S$ gas through the solution to precipitate rhenium sulfide. The precipitate is separated from the filtrate and digested in a base, e.g., ammonium hydroxide, in the presence of peroxide. The solution obtained may be filtered to remove any remaining impurities, as, for example, solid platinum, and the solution dried to recover rhenium. Alternatively, the solution containing dissolved rhenium can be used in the preapration of fresh catalyst.

When reclaiming the metals from a catalyst comprising platinum and rhenium on a porous solid carrier, and substantial amounts of rhenium are removed by the process of the present invention, the resulting catalyst comprising platinum and small amounts of rhenium can be further processed to recover platinum and rhenium in the pure form. For example, the catalyst can be digested in a strong alkali solution to dissolve the support, leaving a platinum-rhenium residue. The residue can be dissolved in a strong acid and then the solution passed through an ion exchange resin to remove platinum from rhenium.

The recovery of rhenium by the process of the present invention will be more clearly understood by reference to the following examples.

EXAMPLE 1

A fresh catalyst comprising 0.6 weight percent platinum and 0.6 weight percent rhenium associated with an alumina support (Catalyst A) was heated in flowing air for 16 hours at 900° F. An analysis of the platinum and rhenium present on the catalyst after heating showed that the calcination process had not resulted in the loss of any platinum or rhenium. Five grams of the catalyst comprising oxidized rhenium were contacted with 50 milliliters of an aqueous solution comprising 2 weight percent sodium carbonate (0.19 M Na$_2$CO$_3$) for 15 minutes at ambient temperature and pressure. The pH of the solution was about 11. The solution was drained off and the catalyst dried overnight at 392° F. Analysis of the catalyst showed that about 57 percent of the rhenium was removed. Essentially none of the platinum and alumina was dissolved during the contact with the sodium carbonate solution.

A sample of catalyst which had been used in a reforming process for more than 5500 hours, said catalyst comprising 0.6 weight percent platinum and 0.6 weight percent rhenium on alumina (Catalyst B), was calcined in air for 16 hours at 900° F. No rhenium was lost by the calcination step. Five grams of the calcined catalyst was contacted with 50 milliliters of an aqueous solution comprising 2 weight percent sodium carbonate solution for about 15 minutes. The solution was removed and the catalyst dried overnight at 392° F. The catalyst was analyzed for rhenium and found to contain only about 0.18 weight percent; thus approximately 70 percent of the rhenium was removed. Essentially no platinum or alumina was removed from the catalyst by the present rhenium reclaiming process.

Another sample of Catalyst B was calcined in air at 1200° F. for four hours. Thereafter 4 grams of calcined catalyst were contacted with 15 milliliters of aqueous solution comprising 2 weight percent sodium carbonate solution for about 15 minutes at room temperature. The sodium carbonate solution was removed and the catalyst washed, dried and subsequently recalcined at 1200° F. for 4 hours. The recalcined catalyst was then soaked in 2 percent sodium carbonate solution for 15 minutes at room temperature. After removal of sodium carbonate solution, analysis of the catalyst showed that about 93 percent of the rhenium originally present on the catalyst was extracted.

EXAMPLE 2

A sample of catalyst comprising 0.6 weight percent platinum and 0.6 weight percent rhenium on alumina was artificially aged by heating the catalyst for 24 hours at 1000° F. in wet hydrogen. The catalyst was then heated for 2 hours at 1000° F. in an ammonia-oxygen atmosphere, the mole ratio of ammonia to oxygen being 1 to 3. Two grams of catalyst were then contacted with 14 milliliters of a 0.5 molar HCl solution for 10 minutes. The pH of the solution was about 0.3. An analysis of the extracting HCl solution indicated that approximately 68 percent of the rhenium originally present on the catalyst was removed; less than 5 weight percent of platinum was removed. No noticeable dissolution of the alumina occurred.

A sample of catalyst comprising 0.6 weight percent platinum and 0.6 weight percent rhenium associated with alumina was used in the reforming of a naphtha for about 700 hours. The catalyst was thereafter calcined in air for 2 hours at 950° F. Two grams of the calcined catalyst containing rhenium in the oxidized state were contacted with 14 milliliters of a 0.5 molar HCl solution for 10 minutes. Approximately 77 percent of the rhenium was removed from the catalyst; less than 5 percent of the platinum was removed.

EXAMPLE 3

A catalyst comprising 0.75 weight percent platinum and 0.76 weight percent rhenium on alumina was calcined at 500° F. for 2 hours in air. Three grams of catalyst comprising oxidized rhenium were treated with 22.5 milliliters of a 0.5 molar sodium chloride solution for 10 minutes at room temperature. Analysis of the extracting solution shows that 76 percent of the rhenium present on the catalyst was removed; less than 10 weight percent of platinum was removed.

Sulfuric acid and nitric acid solutions were also used to extract oxidized rhenium from catalysts comprising platinum and rhenium associated with alumina in accordance with the present invention. In all instances, substantial amounts of rhenium were removed without substantial dissolving of the platinum or of the alumina. Care was exercised to maintain the pH of the sulfuric acid and nitric acid solutions above 0; thus, 0.5 molar solutions of the acids were used.

The foregoing disclosure of the present invention is not considered limiting since variations can be made by those skilled in the art without departing from the scope or spirit of the appended claims.

We claim:

1. A process for recovering rhenium from a catalytic composite comprising rhenium associated with a porous solid carrier, which comprises oxidizing said composite to place the rhenium in the oxidized state and then treating said composite containing rhenium in the oxidized state with an ionic solution having at least 0.05 mole per liter of solution of anion dissolved in said solution, the total amount of anion in solution exceeding the total amount of rhenium on said catalytic composite, said ionic solution being at a temperature below 200° F., at a pH from 0 to 12 for a sufficient period of time to dissolve said rhenium without substantial dissolving of said porous solid carrier.

2. A process for recovering rhenium from a catalytic composite comprising a Group VIII noble metal and rhenium associated with an inorganic oxide carrier, which comprises oxidizing said rhenium by heating said catalytic composite in an oxygen containing atmosphere at a temperature from about 300° F. to 1400° F., then dissolving said oxidizing rhenium without substantial dissolving of said Group VIII noble metal and said inorganic oxide carrier by treating said oxidized rhenium-containing catalytic composite with an ionic solution having at least 0.05 mole per liter of anion dissolved in said solution, the total amount of anion in solution exceeding the total amount of rhenium on said catalytic composite, said solution being at a temperature below 200° F., at a pH of from 0 to 12 for a period of time from about 5 minutes to 2 hours, the shorter times being used with the solutions of lower pH.

3. The process of claim 2 wherein said Group VIII noble metal is platinum.

4. The process of claim 2 wherein said inorganic oxide is alumina.

5. The process of claim 2 wherein the pH of said ionic solution is from 2–12.

6. The process of claim 2 wherein said ionic solution is a salt solution.

7. The process of claim 6 wherein the pH of said salt solution is from 4–10.

8. The process of claim 2 wherein said catalytic composite is treated with said ionic solution for a period of time of from 5 to 30 minutes.

References Cited

UNITED STATES PATENTS

| | | | |
|---|---|---|---|
| 2,635,080 | 4/1953 | Appell | 252—412 |
| 2,805,941 | 9/1957 | Tucker | 75—121 |
| 2,863,762 | 12/1958 | Pullen | 75—121 |
| 2,963,445 | 12/1960 | Nixon | 252—412X |

HERBERT T. CARTER, Primary Examiner

U.S. Cl. X.R.

23—134, 22, 23, 24, 51; 252—412, 413